(12) United States Patent
Soliman et al.

(10) Patent No.: US 10,198,059 B2
(45) Date of Patent: Feb. 5, 2019

(54) ADAPTIVE DOZE TO HIBERNATE

(71) Applicant: Microsoft Technology Licensing, LLC, Redmond, WA (US)

(72) Inventors: M. Nashaat Soliman, Redmond, WA (US); Paresh Maisuria, Issaquah, WA (US); Arun U. Kishan, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 3 days.

(21) Appl. No.: 15/249,749

(22) Filed: Aug. 29, 2016

(65) Prior Publication Data

US 2017/0308148 A1    Oct. 26, 2017

Related U.S. Application Data

(60) Provisional application No. 62/325,367, filed on Apr. 20, 2016.

(51) Int. Cl.
*G06F 1/32*    (2006.01)
*G06F 1/26*    (2006.01)
*G06F 9/4401*    (2018.01)

(52) U.S. Cl.
CPC ............ *G06F 1/3212* (2013.01); *G06F 1/263* (2013.01); *G06F 1/3231* (2013.01); *G06F 1/3296* (2013.01); *G06F 9/4418* (2013.01)

(58) Field of Classification Search
CPC ........ G06F 1/3202; G06F 1/3231; G06F 1/26; G06F 1/206; G06F 1/3228; G06F 1/08;
(Continued)

(56) References Cited

U.S. PATENT DOCUMENTS 5,954,820 A    9/1999  Hetzler
6,961,859 B2   11/2005 Derocher et al.
(Continued)

FOREIGN PATENT DOCUMENTS

WO         9607964 A1    3/1996

OTHER PUBLICATIONS

"Power Management in Windows XP", Published on: Jan. 9, 2011, Available at: https://msdn.microsft.com/en-us/library/ms704147(v=vs.85).aspx.
(Continued)

*Primary Examiner* — Zahid Choudhury

(57) ABSTRACT

Adaptive doze to hibernate scheme techniques are described for power management of a computing device. Rather than relying upon a fixed timer to control device power states, the adaptive doze to hibernate scheme monitors various hibernate parameters and adapts the hibernation experience in dependence upon the parameters. The hibernate parameters may include but are not limited to a standby budget, minimum standby time, reserve screen on time, and indications of user presence. In operation, a power manager monitors battery drain rate and adaptively determines when to change the device power states of the computing device based on the observed drain rate and the hibernate parameters. The power manager may selectively switch between various states (e.g., high performance, active, wake, standby, hibernate, off, etc.) accordingly.

20 Claims, 7 Drawing Sheets

(58) Field of Classification Search
CPC ....... G06F 1/3289; G06F 1/266; H04L 12/12; H04L 12/10
See application file for complete search history.

(56) References Cited

U.S. PATENT DOCUMENTS

| | | | |
|---|---|---|---|
| 7,296,171 | B2 | 11/2007 | Hahn et al. |
| 7,383,137 | B2 | 6/2008 | Hanebutte |
| 7,644,295 | B1 * | 1/2010 | Dotson .................. G06F 1/263 700/12 |
| 7,689,850 | B2 | 3/2010 | Cantwell et al. |
| 7,747,886 | B1 * | 6/2010 | Bridgwater ........... G06F 1/3203 713/323 |
| 7,861,098 | B2 | 12/2010 | Theocharous et al. |
| 8,037,331 | B2 * | 10/2011 | Fiebrich ................ G06F 1/266 320/137 |
| 8,089,368 | B2 | 1/2012 | Hong et al. |
| 9,323,298 | B2 | 4/2016 | van der Lee |
| 2002/0152408 | A1 | 10/2002 | Inui et al. |
| 2006/0101292 | A1 | 5/2006 | Hahn et al. |
| 2009/0119527 | A1 | 5/2009 | Kim |
| 2010/0277326 | A1 | 11/2010 | Berk et al. |
| 2011/0154078 | A1 | 6/2011 | Nrusimhan N.V. et al. |
| 2012/0210325 | A1 | 8/2012 | de Lind van Wijngaarden et al. |
| 2013/0262890 | A1 * | 10/2013 | Marshall ............... G06F 1/3212 713/320 |
| 2014/0245043 | A1 | 8/2014 | Frid |

OTHER PUBLICATIONS

Gunther, Cory, "How to Fix Bad LG G4 Battery Life", Published on: Feb. 15, 2016, Available at: http://www.gottabemobile.com/2016/02/15/how-to-get-better-lg-g4-battery-life/.

Huculak, Mauro, "How to optimize battery life in Windows 10 devices using built-in settings", Published on: Jul. 8, 2015, Available at: http://www.windowscentral.com/how-optimize-battery-life-windows-10-settings.

Hoffman, Chris, "How Connected Standby Works (or Why Your Windows 8 PC's Battery Drains So Fast)", Publication on: May 16, 2014, Available at: http://www.howtogeek.com/189224/how-conneoted-standby-works-or-why-your-windows-8-pcs-battery-drains-so-fast/.

"Optimizing for Doze and App Standby", Published on: Oct. 1, 2015, Available at: http://developer.android.com/training/monitoring-device-state/doze-standby.html.

"International Search Report and Written Opinion", Application No. PCT/US2017/026263, dated Jul. 19, 2017, 12 pages.

* cited by examiner

ADAPTIVE DOZE TO HIBERNATE

RELATED APPLICATION

This application claims priority under 35 USC § 119 to U.S. Provisional Patent Application Ser. No. 62/325,367, filed Apr. 20, 2016, entitled "Adaptive Doze to Hibernate", the disclosure of which is incorporated herein by reference in its entirety.

BACKGROUND

As technology has advanced, mobile computing devices have become increasingly commonplace. Mobile computing devices provide various functionality to users, allowing the user to interact with the device to check email, surf the web, compose text messages, interact with applications, and so on. One challenge that faces developers of mobile computing devices is efficient power management and extension of battery life. For example, extended processing of tasks by processors at or near capacity may drain the device battery, causing the device to shut down. Various power management strategies may be applied to control processor and battery utilization generally at the expense of overall device performance. If power management implemented for a device fails to strike a good balance between performance and battery life, user dissatisfaction with the device and manufacturer may result.

SUMMARY

In accordance with one or more implementations, an adaptive doze to hibernate scheme is utilized for power management of a computing device. Rather than relying upon a fixed timer to control device power states, the adaptive doze to hibernate scheme monitors various hibernate parameters and adapts the hibernation experience in dependence upon the parameters. The hibernate parameters may include but are not limited to a standby budget, minimum standby time, reserve screen on time, and indications of user presence. In operation, a power manager monitors battery drain rate and adaptively determines when to change the device power states of the computing device based on the observed drain rate and the hibernate parameters. The power manager may selectively switch between various states (e.g., high performance, active, wake, standby, hibernate, off, etc.) accordingly.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Operating Environment

Figure 1:
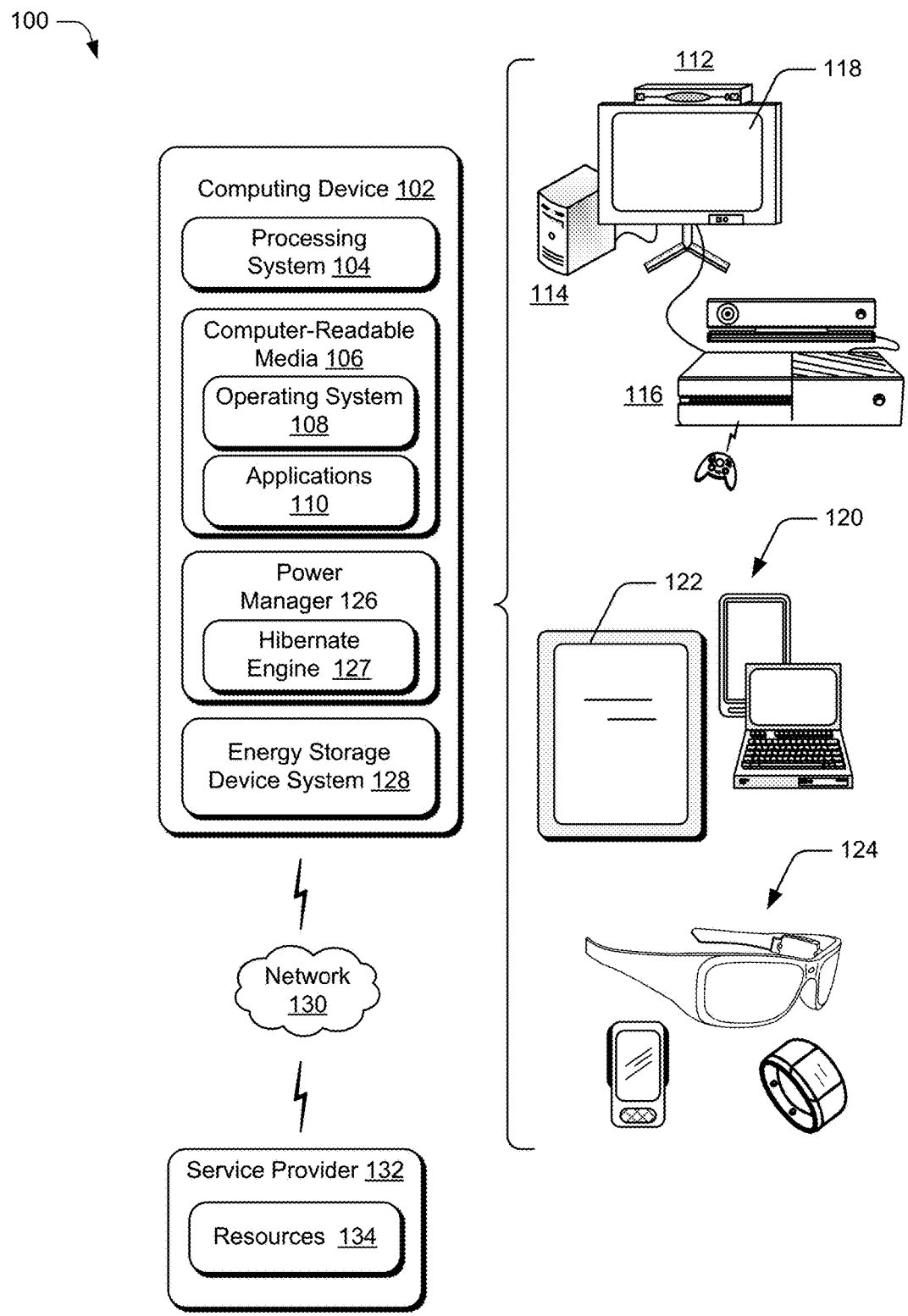
FIG. 1 illustrates an operating environment in accordance with one or more embodiments.

FIG. 1 illustrates an operating environment in accordance with one or more embodiments, generally at 100. The environment 100 includes a computing device 102 having a processing system 104 with one or more processors and devices (e.g., CPUs, GPUs, microcontrollers, hardware elements, fixed logic devices, etc.), one or more computer-readable media 106, an operating system 108, and one or more applications 110 that reside on the computer-readable media and which are executable by the processing system. The processing system 104 may be configured to include multiple independent processors configured in parallel or in series and one or more multi-core processing units. A multi-core processing unit may have two or more processors ("cores") included on the same chip or integrated circuit. In one or more implementations, the processing system 104 may include multiple processing cores that provide a range of performance capabilities, processing efficiencies, and power usage characteristics.

The processing system 104 may retrieve and execute computer-program instructions from applications 110 to provide a wide range of functionality to the computing device 102, including but not limited to gaming, office productivity, email, media management, printing, networking, web-browsing, and so forth. A variety of data and program files related to the applications 110 can also be included, examples of which include game files, office documents, multimedia files, emails, data files, web pages, user profile and/or preference data, and so forth.

The computing device 102 can be embodied as any suitable computing system and/or device such as, by way of example and not limitation, a gaming system, a desktop computer, a portable computer, a tablet or slate computer, a handheld computer such as a personal digital assistant (PDA), a cell phone, a set-top box, a wearable device (e.g., watch, band, glasses, etc.), and the like. For example, as shown in FIG. 1 the computing device 102 can be implemented as a television client device 112, a computer 114, and/or a gaming system 116 that is connected to a display device 118 to display media content. Alternatively, the computing device may be any type of portable computer, mobile phone, or portable device 120 that includes an integrated display 122. A computing device may also be configured as a wearable device 124 that is designed to be worn by, attached to, carried by, or otherwise transported by a user. Examples of wearable devices 124 depicted in FIG. 1 include glasses, a smart band or watch, and a pod device such as clip-on fitness device, media player, or tracker. Other examples of wearable devices 124 include but are not limited to badges, a key fob, an access card, and a ring, an article of clothing, a glove, or a bracelet, to name a few examples. Any of the computing devices can be implemented with various components, such as one or more processors and memory devices, as well as with any combination of differing components. One example of a computing system that can represent various systems and/or devices including the computing device 102 is shown and described below in relation to FIG. 6.

The computer-readable media can include, by way of example and not limitation, all forms of volatile and non-volatile memory and/or storage media that are typically associated with a computing device. Such media can include ROM, RAM, flash memory, hard disk, removable media and the like. Computer-readable media can include both "computer-readable storage media" and "communication media," examples of which can be found in the discussion of the example computing system of FIG. 6.

The computing device 102 may also include a power manager 126 that includes or makes use of a hibernate engine 127, and an energy storage device system 128 having one or multiple energy storage devices (e.g., batteries) that operate as described above and below. The power manager 126 represents functionality operable to manage power for the computing device in various ways. For example, the power manager 126 may assess system-wide power management considerations and manage availability of energy storage devices, processors, and/or processing cores based on the assessment. In one or more implementations, the power manager 126 is configured to implement a switching policy established based on power management considerations to control the energy storage device system 128. The power manager 126 may also implement an adaptive doze to hibernate scheme to control changes between device states based on various parameters and considerations as discussed herein.

In this context, the hibernate engine 127 represents functionality that the power manager may include, invoke, or otherwise employ to make assessments regarding power availability and usage of the computing device and to make decisions regarding when to switch between different devices states accordingly. For example, the hibernate engine 127 may be implemented to control when to transition the computing device 102 between device states such as high performance, active, wake, standby, hibernate, and off. The assessment may involve analyzing factors including but not limited to power drain rates, charge levels/states, the device power state, actual and expected workloads, thermal conditions, user presence, processor/core utilization, application context, device context, priority, contextual clues, and other suitable performance metrics that may be used to drive power management decisions at the system level. Based on the assessment, the power manager 126 is operable to communicate control signals or otherwise interact with the energy storage system 128, processing system 104, and operating system 108 to direct operation of components to switch between the different device states in accordance with the adaptive doze to hibernate scheme implemented via the hibernate engine 127.

Generally, various power management states may be defined for a device that correspond to different levels of performance, resources availability and user activity. Different states are utilized based on factors such as the current workload, priority of tasks, available power, power type available (e.g., plugged in or on battery supply, etc.), user presence and so forth. A hierarchy of states may be defined that span a range from high power/high performance to minimal or no power usage. Selectively transitioning to lower power usage states provides a way to conserve power and increase battery life, while still servicing high performance tasks when needed. By way of example and not limitation, states may include high performance, active, wake, standby, hibernate, and off states.

High performance state is associated with resource intensive tasks, significant user engagement, and high power utilization. Active and wake states represent intermediate states that may be associated with different levels of user activity and moderate power utilization. The standby state is a low-power state used to conserve power during low user activity or a period of inactivity. In standby state, a display screen and other system components may be turned off to reduce power consumption. Data regarding the interaction context is stored in RAM or other quick access memory to enable resumption of activities quickly. Hibernate represents an even deeper power conservation state in which the interaction context is migrated to longer term storage, such as hard disk memory, and most system components may be turned off. Consequently, resumption of activities from hibernate takes additional time in comparison with standby, however, power usage in hibernate is less than in standby. In off state, the device is shut down completely and/or the battery is fully drained. Additional or fewer states may be employed and different arrangements and types of states are also contemplated. The techniques described herein are not limited to the example states enumerated, but rather the techniques may be applied to control state selection and transitions between different states in various scenarios, power management schemes, and implementations of a set of multiple states for power management.

The hibernate engine 127 implements control over at least transitions to and from a hibernate state (or a similar or comparable state included in a power management scheme). Existing logic for entering a hibernate state relies on a fixed doze to hibernate timer that controls transitions from standby to hibernate. The idea of a fixed timer provides a simple model for implementation and debugging and is also conceptually simpler to design. However, the fixed timer based logic has some significant user experience drawbacks. The fixed timer approach does not adapt to address rapid drain of battery in the case of spikes to high power levels. Accordingly, the hibernate timeout is generally set to an overly cautious value to account for the worst case drain. This approach limits the potential user experience when the worst case is not encountered. Additionally, the system can still fully drain the battery while in standby if the drain occurs within specified timeout period.

In contrast to fixed timers, the adaptive doze to hibernate scheme implemented via the hibernate engine 127 is designed to control device state selection and transitions based on a set of defined parameters and observed conditions. The hibernate engine 127 monitors the actual drain rate and adapts the control scheme accordingly. Thus, under high drain conditions a transition to hibernate may occur more rapidly than when the observed drain rate is lower. The hibernate engine 127 may also rely upon indications of user presence to adapt the scheme and make decisions regarding when to enter different states or switch between states. For instance, user presence indications may be used to ascertain when a user is not present with respect to a device. In this case, the transitions to hibernate may also occur more rapidly since the additional time to wake back-up from hibernate is not likely to be disruptive to the user. Details regarding these and other aspects of the adaptive doze to hibernate scheme are discussed below.

As mentioned, the energy storage device system 128 is configured to include one or multiple energy storage devices. Energy storage devices may be configured in various ways and be implemented in various combinations of identical devices and/or heterogeneous devices having different characteristics. The power manager 126 and energy storage device system 128 may be provided using any suitable combination of hardware, software, firmware, and/or logic devices. As illustrated, the power manager 126 and energy storage device system 128 may be configured as separate, standalone systems. In addition or alternatively, the power manager 126 may also be configured as a system or module that is combined with the operating system 108 or implemented via a controller or other component of the energy storage device system 128. Details regarding these and other are discussed in the following section.

The environment 100 further depicts that the computing device 102 may be communicatively coupled via a network 130 to a service provider 132, which enables the computing device 102 to access and interact with various resources 134 made available by the service provider 132. The resources 134 can include any suitable combination of content and/or services typically made available over a network by one or more service providers. For instance, content can include various combinations of text, video, ads, audio, multi-media streams, applications, animations, images, webpages, and the like. Some examples of services include, but are not limited to, an online computing service (e.g., "cloud" computing), an authentication service, web-based applications, a file storage and collaboration service, a search service, messaging services such as email and/or instant messaging, and a social networking service.

Having described an example operating environment, consider now example details and techniques associated with one or more implementations.

Adaptive Doze to Hibernate Details

To further illustrate, consider the discussion in this section of example devices, components, procedures, and implementation details that may be utilized to provide an adaptive doze to hibernate scheme as described herein. In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Example Device

Figure 2:
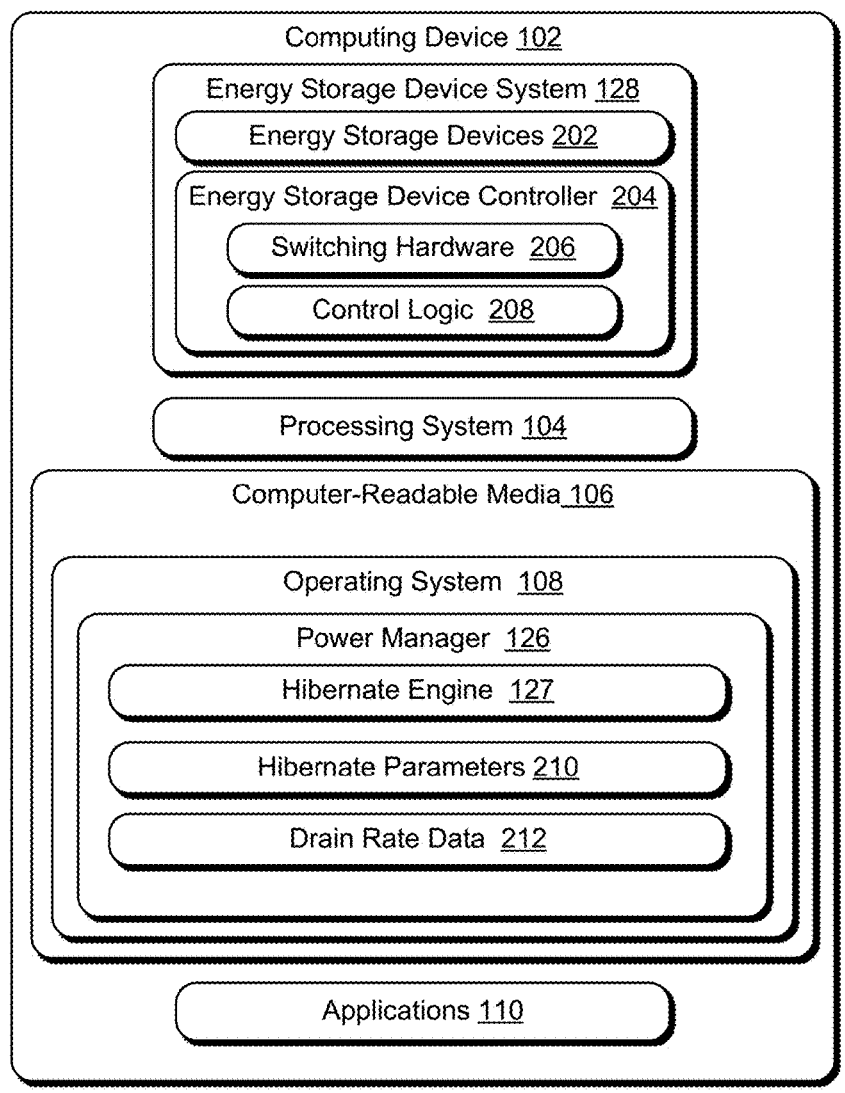
FIG. 2 depicts example details of a computing device having a hibernate engine configured to provide an adaptive doze to hibernate scheme in accordance with one or more implementations.
Figure 2:
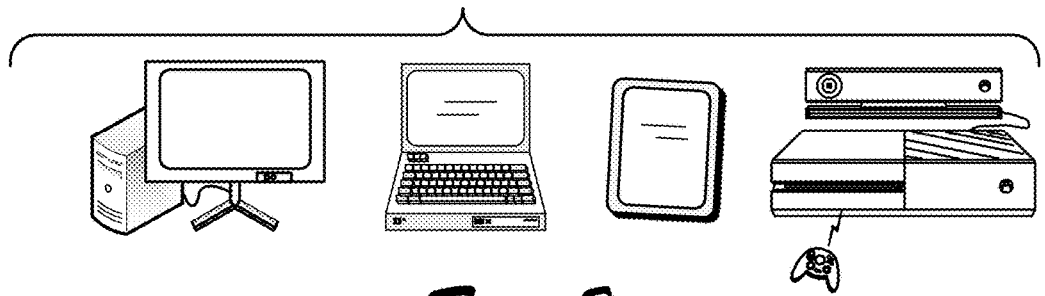

FIG. 2 depicts generally at 200 example details of a computing device 102 having an energy storage device system 128 with energy storage devices in accordance with one or more implementations. Computing device 102 also includes processing system 104, computer readable media 106, operating system 108 and applications 110 as discussed in relation to FIG. 1. In the depicted example, a power manager 126 is also shown as being implemented as a component of the operating system 108.

By way of example and not limitation, the energy storage device system 128 is depicted as having energy storage devices 202 and an energy storage device controller 204. The energy storage devices 202 are representative of various different kinds of energy storage devices that may be included with the computing device 102. These energy storage devices can include, for example, battery cells, supercapacitors, and so forth. It should be noted that these energy storage devices include various devices that store energy as opposed to being an external plug-in AC power source. As mentioned, energy storage devices 202 include energy storage devices having different characteristics such as different sizes/capacities, chemistries, battery technologies, shapes, state of charge (SOC), age, temperature, and so forth (heterogeneous energy storage devices). The different characteristics may include different "properties" of the energy storage devices (e.g., chemistries, sizes, capacities) and different "states" in which the energy storage devices are currently operating (e.g., "SoC", age, temperature). Various combinations of energy storage devices 202 may be utilized to provide a range of capacities, performance capabilities, efficiencies, and power usage characteristics.

The energy storage device controller 204 is representative of a control system to control operation of the energy storage device system 128 and delivery of power from the energy storage devices 202 to service a system load of the computing device 102. The system load refers to the energy required by the computing device 102 at any given point in time in order to operate. The energy storage device controller 204 may be configured using various logic, hardware, circuitry, firmware, and/or software suitable to connect the energy storage devices 202 one to another, supply power to the system, switch between the energy storage devices, and so forth. By way of example and not limitation, the energy storage device controller 204 in FIG. 2 is depicted as including switching hardware 206 and control logic 208 that is operable to selectively switch between different designated energy storage devices 202 at different times.

In one approach, selection of an energy storage device 202 and the device state occurs under the influence of the power manager 126. As noted previously, the power manager 126 represents functionality operable to manage power delivery and makes policy decisions regarding the device state according to various criteria. The power manager 126 includes a hibernate engine 127 configured to make assessments used to control the device state. By way of example, the hibernate engine 127 may operate to control whether the device enters a standby state or a hibernate state in response to an assessment of current usage, power availability, thermal conditions and so forth. The hibernate engine 127 may also operate to determine when to switch between the standby and hibernate states, and further to determine when to wake the device back-up and/or enter an active state after entering standby or hibernate.

In implementations, the hibernate engine 127 is configured to rely upon various hibernate parameters 210 and drain rate data 212 to make decisions regarding when to change device states and which states are selected for observed conditions. The hibernate parameters 210 reflect policy settings and conditions used to define the state transitions.

Hibernate parameters 210 include but are not limited to a standby budget, minimum standby time, reserve screen on time, and indications of user presence. Hibernate parameters 210 are employed to establish a policy that specifies conditions that trigger different states and state transitions. The standby budget represents a configurable budget parameter that controls the amount of power available over a period of time for consumption in standby state (or another designated state from which a transition is being made). After the budget is depleted the system may skip past the standby state and enter hibernate more quickly. The standby budget may be expressed as a percentage usage over a time period such as 10% battery usage of 24 hours. The budget may be replenished for the next period when the time period passes and/or when the device is plugged in and recharged to a threshold level of charge.

The minimum standby time is a configurable time parameter that specifies an amount of time (for example 5 to 10 minutes) to stay in standby state, or the current state, before transitioning to hibernate, or a different selected state, is enabled. Minimum standby time is used to keep the system from moving too quickly into the hibernate state following a switch to standby. By doing so, the system is kept longer in standby for quick resumption so the system is ready if a user has just steeped out briefly, answered a phone call and stopped activity for a short time, and so forth.

The reserve screen on time represents a reserve parameter that specifies a configurable amount of reserved time and/or power to maintain for device readiness. Here, the policy is designed to provide a designated amount of time the device and display screen is able to operate when coming out of a hibernate or off state. If the system becomes active and goes to standby, and the battery level falls below the reserve screen on time, the system will hibernate after a grace period. The reserve screen on time prevents a situation in which the battery is completely drained and the user returns to find they cannot start their device at all or just gets a low battery indication. The reserve screen on time provide at least some amount of time such as 10-20 minutes in which a user may be able to use the device and take action before power is completely drained. The reserve screen on time is mapped to an amount of battery power to reserve to accommodate the reserved usage time. If (while in standby) the available power level of the battery system falls below the level required for reserve screen on time, the system will hibernate after a designated grace period. Since the power usage depends on user activity, the amount of time and battery reserve can be set and adjusted on a user specific basis according to usage history. An initial/default value may be defined (for example 5 to 10%) and then this value may be adjusted based on the user's particular behaviors, habits, and power consumption levels for activities the user engages in.

The hibernate engine 127 is further configured to rely indications of user presence to implement and adjust the control scheme. In general, the hibernate engine 127 may use knowledge regarding whether a user is present or not to determine when to enter hibernate state or delay entry into the hibernate state. For instance, when a determination is made that the user is not present, the hibernate engine 127 may be configured to cause the system to enter hibernate more quickly. In doing so, the indications of user presence may override other parameters such as the minimum standby time. On the other hand, when a determination is made that the user is present or is likely to return within some defined amount of time, hibernate engine 127 may be configured to cause the system to remain in a standby state or other ready state longer so the system is available quicker when the user arrives.

The hibernate engine 127 may obtain indications of user presence using various techniques. In implementations, the hibernate engine 127 may make use of a service that tracks user interaction across different devices of the user and/or presence sensing at the various devices. The service is designed to enable a user to opt-in to device usage and location tracking. When a user actives cross device tracking, the service is able to determine which of the user's devices are being used at a given time and additionally may gather information regarding the user's location, travel, and habits.

User presence may be detected based on user activity with the device, input supplied using input devices, presence sensors, GPS and other location tracking devices, Wifi and cellular access point usage, and so forth.

Information may be shared across the user's devices to enable intelligent management of the devices. In one example, the hibernate engine 127 uses the presence information regarding the user's location, travel, and habits to implement a smart hibernate mode designed to adjust power states accordingly. Thus, if the user is using a mobile device at a location away from home, a hibernate engine 127 on the user's home computer may place that computer into hibernate. If the cross device tracking information indicates/predicts that the user is traveling to work and will arrive shortly, a hibernate engine 127 deployed to the user's work computer can prepare the work computer to wake-up shortly by entering into standby. If the user's habits indicate that the user rarely uses the mobile phone while at work, a hibernate engine 127 deployed to the mobile phone can cause the phone to enter hibernate for the work day and then wake to a more alert state at an appropriate time later in the day, such as by arming a wake timer. Use of user presence prediction information to arm a wake timer may be constrained based on a threshold setting for power. For example, a threshold setting may specify a percentage or value above the standby budget to have available in order to take proactive wake actions. By way of example, the threshold setting may designate that at least 10% of the standby power budget remains to enable proactive wake actions. Various other examples of using user presence indications in connection with the described techniques are also contemplated.

The drain rate data 212 represents information regarding the rate at which power available via the energy storage system is being utilized. Drain rate data 212 is obtained by monitoring of system power usage though functionality implemented by the OS or other monitoring functionality. The hibernate engine 127 adaptively controls switching between states based upon the drain rate indicated by the drain rate data 212 and the policy reflected by the hibernate parameters 210.

In operation, hibernate engine 127 implements control over at least transitions to and from a hibernate state (or between comparable states). In particular, the hibernate engine 127 controls transitions between a standby state and a hibernate state. To do so, drain rate of the battery systems when in standby is monitored. For example, the system may measure and accumulate total energy used in standby. States are then managed in dependence upon the observed drain rate. The system will take action based on drain rate to either stay in standby or drop down to hibernate as appropriate. The corrective action is configured to take place after the minimum standby time. However, if the observed drain rate will deplete the battery system below the reserved amount (e.g., amount to accommodate reserve screen on time) within the allotted time, the hibernate engine 127 may override the minimum standby time and drop into hibernate to maintain the reserved amount.

In one approach, after the minimum standby time, the drain rate is evaluated against the ideal drain rate (x %/total expected runtime). When the drain rate exceeds the ideal drain rate the system drops to hibernate. The corrective action may also depend on the available standby budget. For example, the drain rate evaluation is performed as long as sufficient standby budget remains for continuing to operate in standby state. If the standby budget is depleted, though, the system drops to hibernate without conducting the evaluation. Likewise, the corrective action may depend on availability of user presence data and/or a corresponding smart hibernate mode. When smart hibernate mode is not active (e.g., user presence data is not available and/or a user has not opted into the service), the evaluation is based on drain rate and/or the standby budget as just described.

On the other hand, when smart hibernate mode is active (e.g., user presence data is available and/or a user has opted into the service), hibernate engine 127 employs information regarding user presence predictions to make determination regarding transitions to hibernate. This may be based on current information regarding user presence and location as well as predictions regarding how long a user will be away and when the user may return to or leave particular locations. In smart hibernate mode, user presence may be used to supplement other hibernate parameters and may override other factors to optimize control. For example, user presence indications may override the standby minimum setting in circumstances that are unlikely to disrupt the user. User presence may also be used in connection with the other factors, such as basing decisions on a combination of the reserve screen on time setting, user presence indications, and the standby budget.

In order to distribute the use of standby budget smoothly over time, the probability that the user will be away can be compared against a mapping function to determine if the system should go to hibernate or not. As the remaining standby budget decreases, the system may be configured to be more aggressive in relying on user presence inference to hibernate.

Figure 2A:
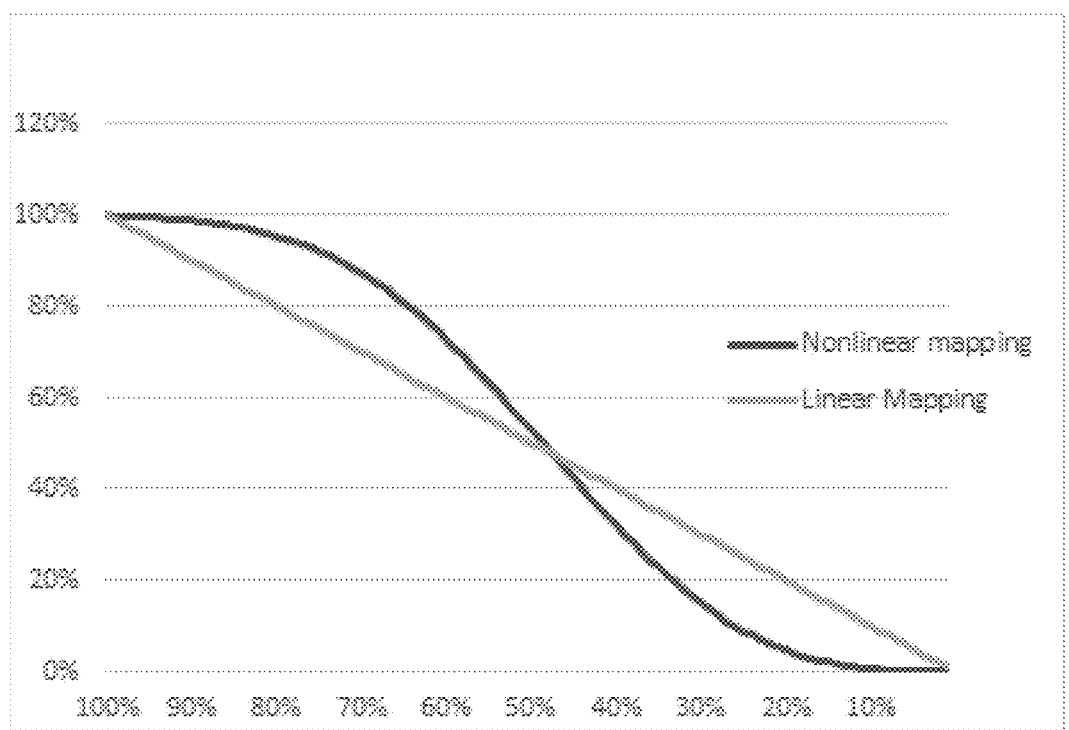
FIG. 2A depicts Chart 214 showing example mapping curves.

FIG. 2A depicts Chart 214 showing example mapping curves. There are two possible proposals reflected by Chart 214: Linear and exponential. An exponential mapping example may be expressed as: Hibernate if Prob (User Away)>1−Exp (−6*(remaining budget/standby budget) ^3). A linear mapping example may be expressed as: Hibernate if Prob (User Away)>(remaining budget/standby budget). These examples are depicted in the Chart 214.

Figure 3:
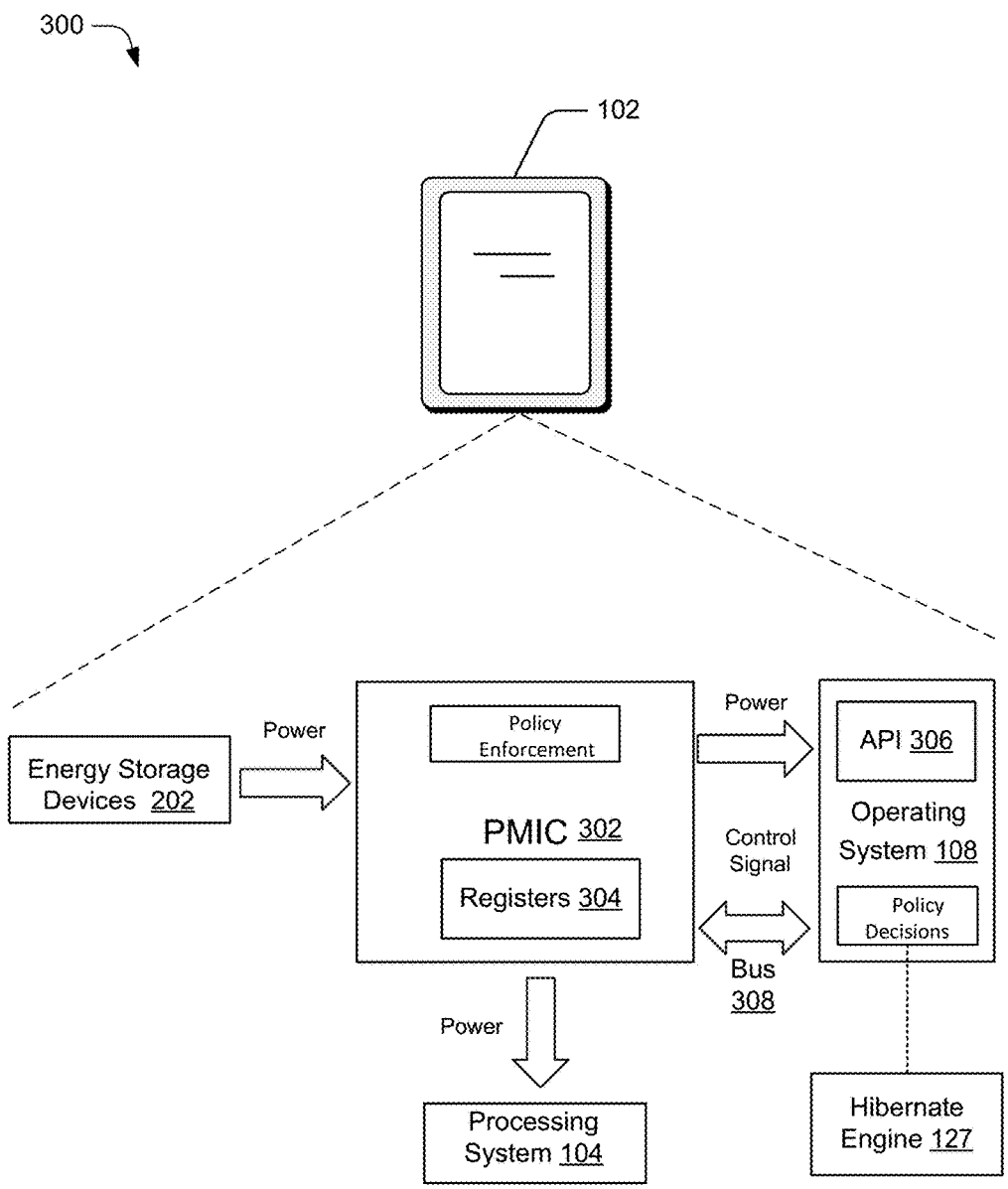
FIG. 3 depicts example details of a power management system in accordance with one or more implementations.

FIG. 3 depicts generally at 300 example details of a power management system in accordance with one or more implementations. In particular, the example of FIG. 3 depicts a system having energy storage devices 202 that may be integrated with a computing device 102. Power is supplied via the energy storage devices using the techniques discussed herein, such as via a power management integrated circuit (PMIC) 302 that is adapted to support adaptive doze to hibernate techniques described herein. For instance, in one or more implementations, the PMIC or other controller is adapted may include registers 304 to facilitate policy enforcement of a device state switching policy, such as a policy reflected by the hibernate parameters 210. The registers 304 may be configured to hold various parameters that used to control operation of hardware and supply power from the energy storage devices accordingly. For example, registers 304 may include registers indicative of the drain rate, the switching policy, a selected power state or mode, a timing register, user presence indications, and other constraints. Registers may be assigned default values selected for general usage in typical scenarios. Registers may then be selectively adapted under the influence of the operating system, power manager 126, hibernate engine 127, and/or user input to implement policy settings for different use cases.

The registers 304 implemented by the energy storage device controller may be exposed to enable operating system 108 and/or application 110 level control over state. In other words, the registers 304 may provide user accessible control over the device state policy. By way of example and not limitation parameter values for the registers 304 may be set and updated dynamically via an application programming interface (API) 306 that is exposed via the operating system 108 as represented in FIG. 3. Thus, the system may implement a default power management scheme and different alternative schemes a user may be able to select. User may also be able to use a power management tool to adapt a scheme to create their own customize power scheme. API messages and or other control signals may be exchanged between the PMIC and operating system over a suitable communication bus 308, one example of which is an I²C bus. Information regarding energy storage device states, workload, drain rates and other parameters may also be communicated to the operating system 108 and/or power manager 126 via the control signals and/or API to facilitate assessments of the operational context and policy decisions based on the operational context.

Thus, as represented in FIG. 3, the operating system 108, by way of a power manager 126 or otherwise, may make policy decisions for device state selection and power management. As represented, policy decisions may be made under the influence of a hibernate engine 127 that operates as described above and below. Policy decisions are made based upon hibernate parameters 210 and drain rate data 212 indicative of policy settings and the operational context. The API 306 provides a mechanism by which control signals are communicated to configured the processing system 104, energy storage devices 202, and other components in accordance with the policy decisions. Thus, the operating system 108 and/or power manager 126 may direct operation of system hardware to implement policy enforcement of a selected policy by setting the registers 404 to effectuate the operational states and constraints specified by the policy. Power is then supplied to the system and power states are controlled in accordance with the policy decisions.

Example Procedures

Figure 4:
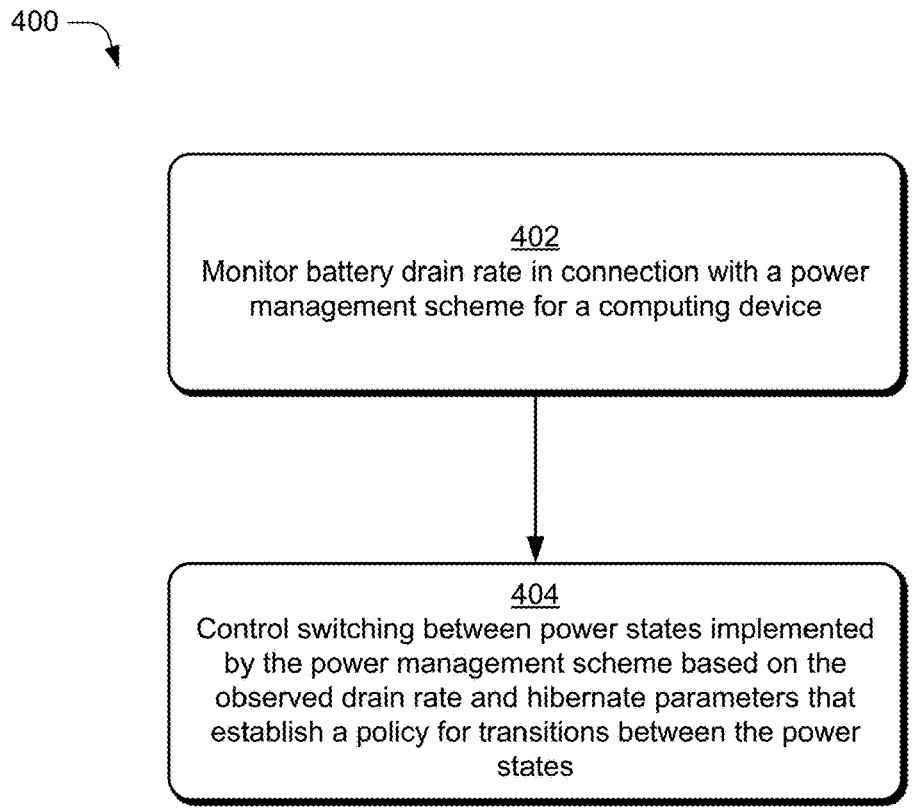
FIG. 4 is a flow diagram that describes details of an example procedure for adaptive doze to hibernate in accordance with one or more implementations.
Figure 5:
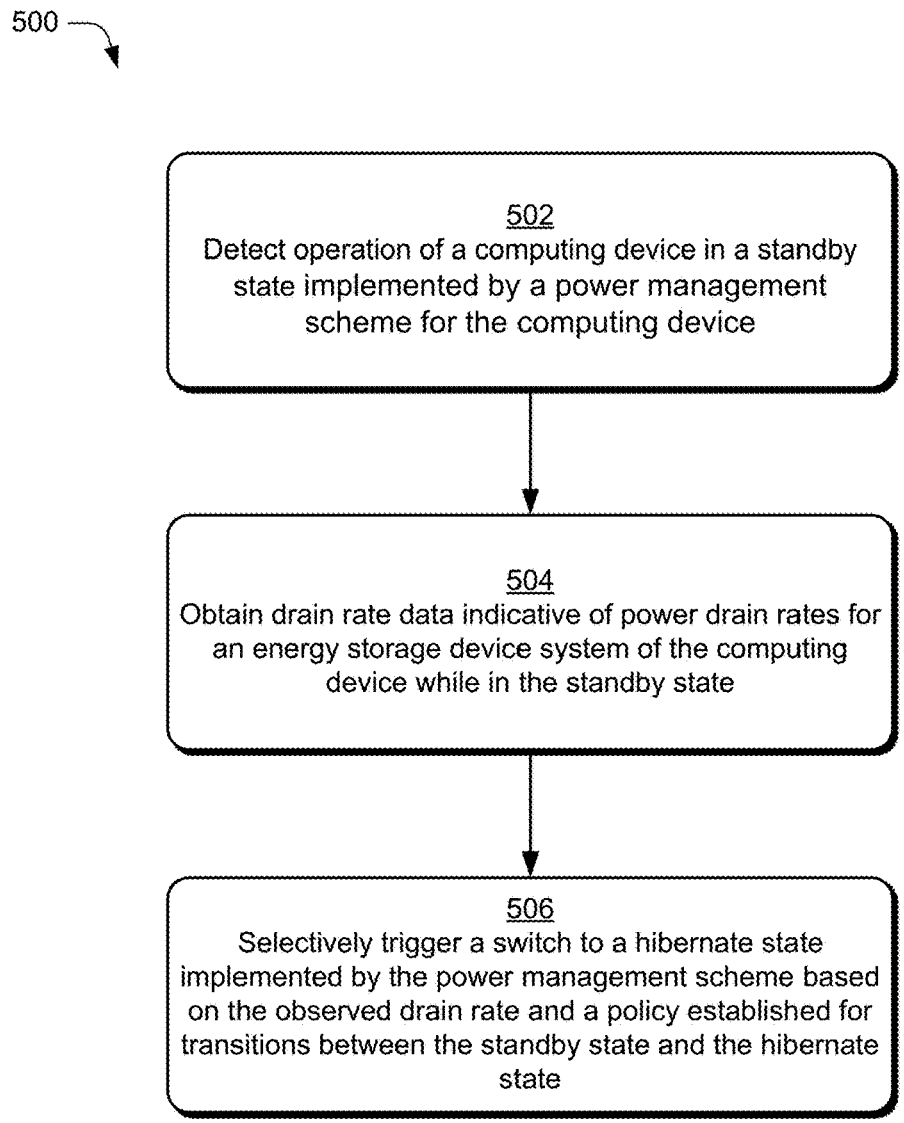
FIG. 5 is a flow diagram that describes details of another example procedure for procedure for adaptive doze to hibernate in accordance with one or more implementations.

Further aspects of adaptive dose to hibernate techniques are discussed in relation to example procedure of FIGS. 4 and 5. The procedures described in this document may be implemented utilizing the environment, system, devices, and components described herein and in connection with any suitable hardware, software, firmware, or combination thereof. The procedures may be represented as a set of blocks that specify operations performed by one or more entities and are not necessarily limited to the orders shown for performing the operations by the respective blocks.

FIG. 4 is a flow diagram that describes details of an example procedure 400 for adaptive doze to hibernate in accordance with one or more implementations. The procedure 400 can be implemented by way of a suitably configured computing device, such as by way of an operating system 108, power manager 126, hibernate engine 127 and/or other functionality described in relation to the examples of FIGS. 1-3. Battery drain rate is monitored in connection with a power management scheme for a computing device (block 402). For example, a hibernate engine 127 may operate to monitor drain rates as described herein. The monitoring may occur in the context of different states such as the example states described in this document. This includes but is not limited to switching between a standby state and hibernate state using the described techniques for adaptive doze to hibernate.

Switching between power states implemented by the power management scheme the computing device is controlled based on the observed drain rate and the hibernate parameters that establish a policy for transitions between the power states (block 404). In particular, the hibernate engine

127 implements an adaptive doze to hibernate scheme that relies upon the drain rate data 212 and various hibernate parameters 210. In general, the hibernate engine 127 causes transitions between states that depend upon and are adapted based on the observed drain rate. As noted transitions to hibernate may be made to maintain a reserved amount of power for reserved screen on time. Decisions may also depend upon a standby budget that specifies an amount of power consumption overall for a defined time period. User presence indications may also be considered as previously described and result in adaptations to the scheme based on user presence. Further, a minimum standby time setting may be used to keep the system from moving too quickly into the hibernate. However, the minimum standby time may be overridden to maintain the specified amount of reserved power or to conserver more power based on knowledge/prediction of user presence.

FIG. 5 is a flow diagram that describes details of another example procedure 500 for adaptive doze to hibernate in accordance with one or more implementations. The procedure 500 can be implemented by way of a suitably configured computing device, such as by way of an operating system 108, power manager 126, hibernate engine 127 and/or other functionality described in relation to the examples of FIGS. 1-3.

Operation of a device in standby state implemented by a power management scheme for a computing device is detected (block 502). Then, drain rate data is obtained that is indicative of power drain rates for an energy storage device system of the computing device while in the standby state (block 504). A switch to a hibernate state implemented by the power management scheme is selectively triggered based on the observed drain rate and a policy established for transitions between the standby state and the hibernate state (block 506).

For example, a power management scheme may include a hierarchy of states as noted herein. The states may include at least a standby state and a hibernate state as described previously (or comparable states). A device may enter and operate in the standby state to conserve power in various scenarios. The device may enter a hibernate state to further reduce consumption under appropriate circumstances. In accordance with techniques discussed herein, a hibernate engine 127 may trigger or recognize the state transition to standby and take action to control device operation in the standby state. In the standby state, the hibernates engine 127 is configured to monitor drain rates to make decision regarding whether to stay in the standby state or cause the system to drop into hibernate. In particular, the hibernate engine 127 makes assessments based in part upon observed drain rates and an established policy. The policy is defined in accordance with various hibernate parameters 210 as previously discussed. The policy specifies conditions that trigger different states and state transitions. Thus, the hibernate engine 127 operates to implement an adaptive doze to hibernate scheme that controls transitions between at least the standby state and the hibernate state.

Having considered the foregoing example details and procedures, consider now a discussion of an example system and components that may be employed for aspects of adaptive doze to hibernate in one or more implementations.

Example System

Figure 6:
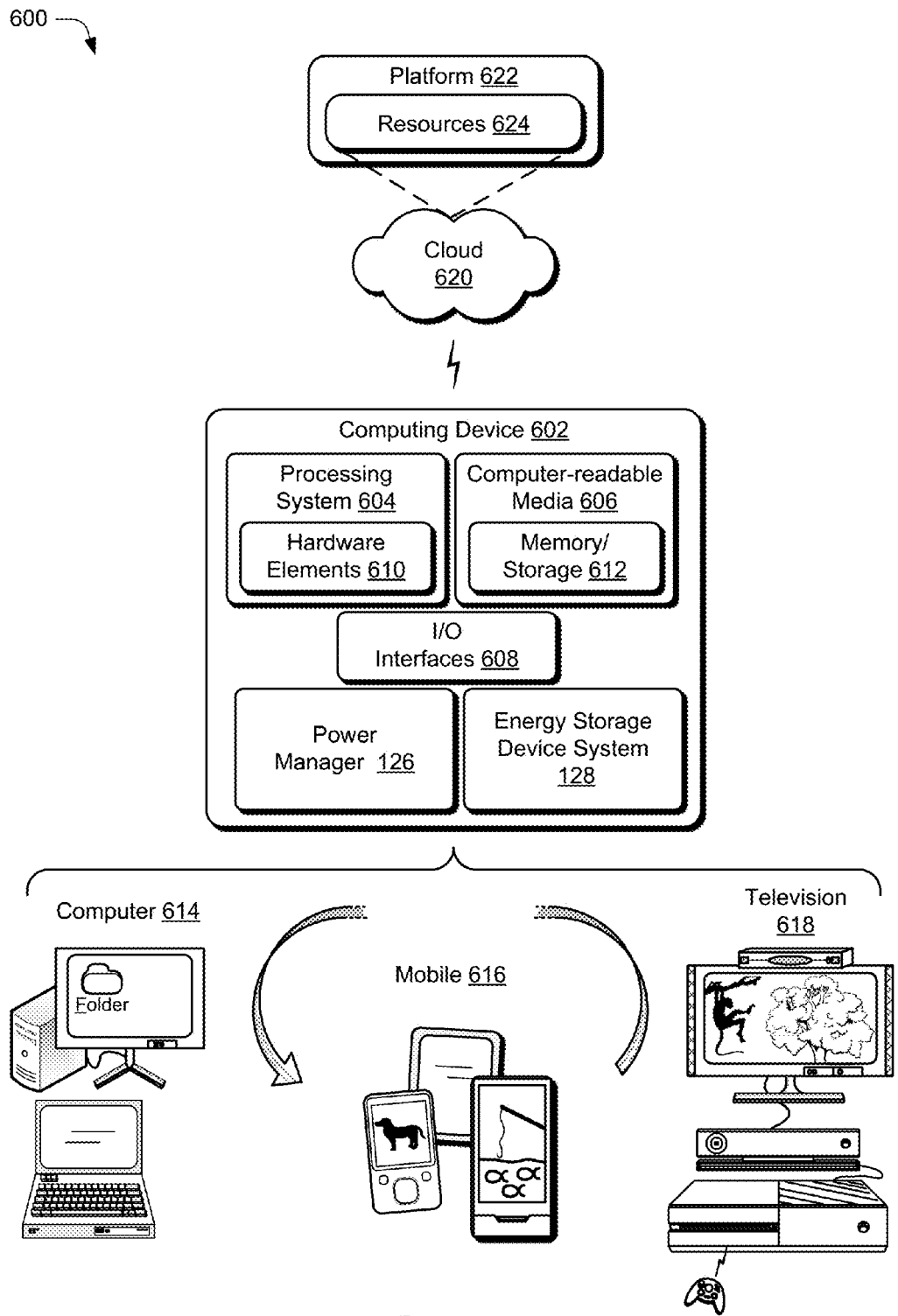
FIG. 6 illustrates an example system that includes an example computing device that is representative of one or more computing systems and/or devices that may implement the various techniques described herein.

FIG. 6 illustrates an example system 600 that includes an example computing device 602 that is representative of one or more computing systems and/or devices that may implement the various techniques described herein. The computing device 602 may be, for example, a server of a service provider, a device associated with a client (e.g., a client device), an on-chip system, and/or any other suitable computing device or computing system.

The example computing device 602 as illustrated includes a processing system 604, one or more computer-readable media 606, and one or more I/O interfaces 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware elements 610 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 606 is illustrated as including memory/storage 612. The memory/storage 612 represents memory/storage capacity associated with one or more computer-readable media. The memory/storage 612 may include volatile media (such as random access memory (RAM)) and/or nonvolatile media (such as read only memory (ROM), Flash memory, optical disks, magnetic disks, and so forth). The memory/storage 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone for voice operations, a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 602 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "communication media."

"Computer-readable storage media" refers to media and/or devices that enable storage of information in contrast to mere signal transmission, carrier waves, or signals per se. Computer-readable storage media does not include signal bearing media, transitory signals, or signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Communication media" may refer to signal-bearing media that is configured to transmit instructions to the hardware of the computing device 602, such as via a network. Communication media typically may embody computer readable instructions, data structures, program modules, or other data in a modulated data signal, such as carrier waves, data signals, or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 606 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules including the operating system 108, applications 110, power manager 126, hibernate engine 127 and other program modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of modules as a module that is executable by the computing device 602 as software may be achieved at least partially in hardware, e.g., through use of computer-readable storage media and/or hardware elements 610 of the processing system. The instructions and/or functions may be executable/operable by one or more articles of manufacture (for example, one or more computing devices 602 and/or processing systems 604) to implement techniques, modules, and examples described herein.

As further illustrated in FIG. 6, the example system 600 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 600, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 602 may assume a variety of different configurations, such as for computer 614, mobile 616, and television 618 uses. Each of these configurations includes devices that may have generally different constructs and capabilities, and thus the computing device 602 may be configured according to one or more of the different device classes. For instance, the computing device 602 may be implemented as the computer 614 class of a device that includes a personal computer, desktop computer, a multi-screen computer, laptop computer, netbook, and so on.

The computing device 602 may also be implemented as the mobile 616 class of device that includes mobile devices, such as a mobile phone, portable music player, portable gaming device, a tablet computer, a multi-screen computer, and so on. The computing device 602 may also be implemented as the television 618 class of device that includes devices having or connected to generally larger screens in casual viewing environments. These devices include televisions, set-top boxes, gaming consoles, and so on.

The techniques described herein may be supported by these various configurations of the computing device 602 and are not limited to the specific examples of the techniques described herein. This is illustrated through inclusion of the power manager 126 and the energy storage device system 128 on the computing device 602. The functionality represented by power manager 126 and other modules/applications may also be implemented all or in part through use of a distributed system, such as over a "cloud" 620 via a platform 622 as described below.

The cloud 620 includes and/or is representative of a platform 622 for resources 624. The platform 622 abstracts underlying functionality of hardware (e.g., servers) and software resources of the cloud 620. The resources 624 may include applications and/or data that can be utilized while computer processing is executed on servers that are remote from the computing device 602. Resources 624 can also include services provided over the Internet and/or through a subscriber network, such as a cellular or Wi-Fi network.

The platform 622 may abstract resources and functions to connect the computing device 602 with other computing devices. The platform 622 may also serve to abstract scaling of resources to provide a corresponding level of scale to encountered demand for the resources 624 that are implemented via the platform 622. Accordingly, in an interconnected device embodiment, implementation of functionality described herein may be distributed throughout the system 600. For example, the functionality may be implemented in part on the computing device 602 as well as via the platform 622 that abstracts the functionality of the cloud 620.

Example Implementations

Example implementations of techniques described herein include, but are not limited to, one or any combinations of one or more of the following examples:

Example 1

A method implemented by a computing device, the method comprising: monitoring battery drain rate in connection with a power management scheme for the computing device; and controlling switching between power states implemented by the power management scheme based on observed drain rate and hibernate parameters that establish a policy for transitions between the power states.

Example 2

The method of any one of more examples in this section, wherein the power states implemented by the power management scheme include at least a standby state and a hibernate state.

Example 3

The method of any one of more examples in this section, wherein monitoring battery drain rate comprises monitoring usage of an energy storage device system of the computing device.

Example 4

The method of any one of more examples in this section, wherein switching between power states is further based on indications of user presence.

Example 5

The method of any one of more examples in this section, wherein the hibernate parameters include one or more of a standby budget, minimum standby time, reserve screen on time, or indications of user presence.

Example 6

The method of any one of more examples in this section, wherein the power management scheme defines a hierarchy of states for power management that span a range from high power and high performance to minimal or no power usage.

Example 7

The method of any one of more examples in this section, wherein the hierarchy of states includes two or more of a high performance state, an active state, a wake state, a standby state, a hibernate state, or an off state.

Example 8

The method of any one of more examples in this section, wherein switching between power states occurs in dependence upon the observed drain rate and a configurable budget parameter set to control an amount of power available over a period of time for consumption in a designated state from which a transition is being made.

Example 9

The method of any one of more examples in this section, wherein switching between power states occurs in dependence upon the observed drain rate and a configurable reserve parameter that specifies one or more of an amount of reserved time or an amount of reserved power to maintain for device readiness.

Example 10

The method of any one of more examples in this section, wherein causing switching occurs in dependence upon the observed drain rate and a configurable time parameter that specifies an amount of time to stay in a current state before transitioning to a different selected state is enabled.

Example 11

The method of claim 1, wherein causing switching between power states comprises communicating control signals to direct operation of hardware components to switch to states indicated by the control signals.

Example 12

A method implemented by a computing device, the method comprising: detecting operation of the computing device in a standby state implemented by a power management scheme for the computing device; obtaining drain rate data indicative of power drain rates for an energy storage device system of the computing device while in the standby state; and selectively triggering a switch to a hibernate state implemented by the power management scheme based on the observed drain rate and a policy established for transitions between the standby state and the hibernate state.

Example 13

The method as recited in any one of more examples in this section, wherein the policy is established based on hibernate parameters including one or more of a standby budget, minimum standby time, reserve screen on time, or indications of user presence.

Example 14

The method as recited in any one of more examples in this section, wherein the policy specifies a standby budget parameter set to control an amount of power available over a period of time for consumption in the standby state.

Example 15

The method as recited in any one of more examples in this section, wherein when the amount of power specified by the standby budget parameter is depleted, the system is configured to skip past the standby state and enter the hibernate state.

Example 16

The method as recited in any one of more examples in this section, wherein the policy specifies a reserve parameter that specifies one or more of an amount of reserved time or an amount of reserved power to maintain for device readiness.

Example 17

The method as recited in any one of more examples in this section, wherein the policy provides an option for a user to opt-in to device usage and location tracking used to obtain indications of user presence.

Example 18

The method as recited in any one of more examples in this section wherein when the user to opts-in to device usage and location tracking, selectively triggering the switch to the hibernate state occurs in dependence upon indications of user presence.

Example 19

The method as recited in any one of more examples in this section, wherein the policy specifies a minimum standby time setting configured to designate an amount of time to remain in standby mode before transitioning to hibernate is enabled.

Example 20

A computing device comprising: an energy storage device system including one or more energy storage devices; one or more processors; and one or more computer-readable storage media having stored thereon instructions that, responsive to execution by the one or more processors, implement a power manager to perform operation comprising: detecting operation of a computing device in a standby state implemented by a power management scheme for the computing device; obtaining drain rate data indicative of power drain rates for an energy storage device system of the computing device while in the standby state; and selectively triggering a switch to a hibernate state implemented by the power management scheme based on the observed drain rate and a policy established for transitions between the standby state and the hibernate state.

CONCLUSION

Although the example implementations have been described in language specific to structural features and/or methodological acts, it is to be understood that the implementations defined in the appended claims are not necessarily limited to the specific features or acts described. Rather, the specific features and acts are disclosed as example forms of implementing the claimed features.

What is claimed is:

1. A method implemented by a computing device, the method comprising:
   monitoring battery drain rate in connection with a power management scheme for the computing device;
   determining a probability of user absence from the computing device; and
   changing from one power state to a different power state implemented by the power management scheme based on:
      an observed drain rate indicated by the battery drain rate;
      hibernate parameters that establish a policy for transitions between the one power state and the different power state; and
      a comparison of the probability of user absence to a mapping function that maps a dependence of the transitions on the probability of user absence to a current value of one of the hibernate parameters.

2. The method of claim 1, wherein monitoring battery drain rate comprises monitoring usage of an energy storage device system of the computing device.

3. The method of claim 1, wherein the changing from the one power state to the different power state is further based on indications of user presence.

4. The method of claim 1, wherein the power management scheme defines a hierarchy of states for power management that span a range from high power and high performance to minimal or no power usage.

5. The method of claim 1, wherein the changing from the one power state to the different power state occurs in dependence upon the observed drain rate and a configurable budget parameter set to control an amount of power available over a period of time for consumption in the one power state.

6. The method of claim 1, wherein the changing from the one power state to the different power state occurs in dependence upon the observed drain rate and a configurable reserve parameter that specifies one or more of an amount of reserved time or an amount of reserved power to maintain for device readiness.

7. The method of claim 1, wherein the changing from the one power state to the different power state occurs in dependence upon the observed drain rate and a configurable time parameter that specifies an amount of time to stay in a current state before transitioning to a different selected state is enabled.

8. The method of claim 1, wherein the changing from the one power state to the different power state comprises communicating control signals to direct operation of hardware components to switch to states indicated by the control signals.

9. A method implemented by a computing device, the method comprising:
   detecting operation of the computing device in a standby state implemented by a power management scheme for the computing device;

obtaining drain rate data indicative of power drain rates for an energy storage device system of the computing device while in the standby state;

determining a probability of user absence from the computing device; and selectively triggering a switch to a hibernate state implemented by the power management scheme based on:
an observed drain rate indicated by the drain rate data;
a policy established for transitions between the standby state and the hibernate state; and
a comparison of the probability of user absence to a mapping function that maps a dependence of the transitions on the probability of user absence to a current value of a hibernate parameter of the policy.

10. The method as recited in claim 9, wherein the policy is established based on hibernate parameters including one or more of a standby budget, minimum standby time, reserve screen on time, or indications of user presence.

11. The method as recited in claim 9, wherein the policy specifies a standby budget parameter set to control an amount of power available over a period of time for consumption in the standby state.

12. The method as recited in claim 11, wherein when the amount of power specified by the standby budget parameter is depleted, the system is configured to skip past the standby state and enter the hibernate state.

13. The method as recited in claim 9, wherein the policy specifies a reserve parameter that specifies one or more of an amount of reserved time or an amount of reserved power to maintain for device readiness.

14. The method as recited in claim 9, wherein the policy provides an option for a user to opt-in to device usage and location tracking used to obtain indications of user presence.

15. The method as recited in claim 14, wherein when the user opts-in to device usage and location tracking, selectively triggering the switch to the hibernate state occurs in dependence upon the indications of user presence.

16. The method as recited in claim 9, wherein the policy specifies a minimum standby time setting configured to designate an amount of time to remain in standby mode before transitioning to hibernate is enabled.

17. A computing device comprising:
an energy storage device system including one or more energy storage devices;
one or more processors; and
one or more computer-readable storage media having stored thereon instructions that, responsive to execution by the one or more processors, implement a power manager to perform operation comprising:
detecting operation of a computing device in a standby state implemented by a power management scheme for the computing device;
obtaining drain rate data indicative of power drain rates for an energy storage device system of the computing device while in the standby state;
determining a probability of user absence from the computing device; and
selectively triggering a switch to a hibernate state implemented by the power management scheme based on:
an observed drain rate indicated by the drain rate data;
a policy established for transitions between the standby state and the hibernate state; and
a comparison of the probability of user absence to a mapping function that maps a dependence of the transitions on the probability of user absence to a current value of a hibernate parameter of the policy.

18. The computing device of claim 17, wherein the policy comprises:
comparing the observed drain rate to an ideal drain rate; and
triggering the switch to the hibernate state when the observed drain rate is greater than the ideal drain rate based on the comparing the observed drain rate to the ideal drain rate.

19. The computing device of claim 17, wherein the selectively triggering comprises:
determining a remaining amount of a standby budget;
comparing, when the remaining amount of the standby budget is above a threshold amount, the observed drain rate to an ideal drain rate; and
triggering, in response to either the observed drain rate being greater than the ideal drain rate or the remaining amount of the standby budget not being above the threshold amount, the switch to the hibernate state.

20. The computing device of claim 17, wherein the drain rate data indicates a rate at which power is being utilized from the energy storage device system of the computing device while in the standby state.

* * * * *